(12) United States Patent
Tapper et al.

(10) Patent No.: US 7,939,579 B1
(45) Date of Patent: May 10, 2011

(54) HYDROGELS AND METHODS OF MANUFACTURE

(75) Inventors: Tristan Tapper, Haverhill (GB); Richard Young, Linton (GB)

(73) Assignee: Contamac Limited, Saffron Walden, Essex (GB)

( * ) Notice: Subject to any disclaimer, the term of this patent is extended or adjusted under 35 U.S.C. 154(b) by 158 days.

(21) Appl. No.: 12/169,788

(22) Filed: Jul. 9, 2008

(51) Int. Cl.
*C08F 290/06* (2006.01)
*C08F 30/08* (2006.01)
*C08F 18/20* (2006.01)

(52) U.S. Cl. ......... 523/107; 526/279; 526/245; 528/499

(58) Field of Classification Search .................. 523/107; 526/279, 245; 528/499
See application file for complete search history.

(56) References Cited

U.S. PATENT DOCUMENTS

| | | | |
|---|---|---|---|
| 2,718,516 A | 9/1955 | Bortnick | |
| 3,284,406 A | 11/1966 | Nelson | |
| 3,700,573 A | 10/1972 | Laizier | |
| 3,708,225 A | 1/1973 | Misch et al. | |
| 3,808,178 A | 4/1974 | Gaylord | |
| 3,916,033 A | 10/1975 | Merrill | |
| 3,935,342 A | 1/1976 | Lim | |
| 3,959,102 A | 5/1976 | Wajs et al. | |
| 3,959,105 A | 5/1976 | Feneberg et al. | |
| 3,992,563 A | 11/1976 | Tanaka | |
| 3,996,187 A | 12/1976 | Travnicek | |
| 4,008,198 A | 2/1977 | Krohberger et al. | |
| 4,022,754 A * | 5/1977 | Howes et al. .................. | 526/264 |
| 4,062,627 A | 12/1977 | Wajs et al. | |
| 4,095,878 A | 6/1978 | Fanti | |
| 4,099,859 A | 7/1978 | Merrill | |
| 4,112,207 A | 9/1978 | Jones | |
| 4,139,513 A | 2/1979 | Tanaka et al. | |
| 4,139,548 A | 2/1979 | Tanaka et al. | |
| 4,139,692 A | 2/1979 | Tanaka et al. | |
| 4,153,641 A | 5/1979 | Deichert et al. | |
| 4,189,546 A | 2/1980 | Deichert et al. | |
| 4,195,030 A | 3/1980 | Deichert et al. | |
| 4,198,131 A | 4/1980 | Birdsall et al. | |
| 4,208,362 A | 6/1980 | Deichert et al. | |
| 4,208,506 A | 6/1980 | Deichert et al. | |
| 4,216,303 A * | 8/1980 | Novicky .......................... | 528/32 |
| 4,235,985 A | 11/1980 | Tanaka et al. | |
| 4,277,595 A | 7/1981 | Deichert et al. | |
| 4,327,203 A | 4/1982 | Deichert et al. | |
| 4,433,111 A * | 2/1984 | Tighe et al. ................. | 525/326.2 |
| 4,451,629 A | 5/1984 | Tanaka et al. | |
| 4,486,577 A * | 12/1984 | Mueller et al. ................. | 525/474 |
| 4,602,074 A * | 7/1986 | Mizutani et al. .............. | 526/245 |
| 4,686,267 A * | 8/1987 | Ellis et al. ...................... | 526/245 |
| 4,711,943 A | 12/1987 | Harvey, III | |
| 4,766,189 A * | 8/1988 | Tsuetaki et al. ............... | 526/245 |
| 4,780,515 A * | 10/1988 | Deichert ........................ | 526/245 |
| 4,910,277 A | 3/1990 | Bambury et al. | |
| 4,954,587 A * | 9/1990 | Mueller ......................... | 526/245 |
| 4,990,582 A * | 2/1991 | Salamone ....................... | 526/245 |
| 5,010,141 A * | 4/1991 | Mueller ......................... | 525/276 |
| 5,011,275 A * | 4/1991 | Mueller ..................... | 351/160 H |
| 5,034,461 A | 7/1991 | Lai et al. | |
| 5,070,215 A | 12/1991 | Bambury et al. | |
| 5,115,056 A * | 5/1992 | Mueller et al. ................. | 526/243 |
| 5,194,556 A * | 3/1993 | Mueller et al. .................. | 528/28 |
| 5,244,981 A * | 9/1993 | Seidner et al. ................ | 525/479 |
| 5,310,779 A | 5/1994 | Lai | |
| 5,314,960 A * | 5/1994 | Spinelli et al. ................ | 525/280 |
| 5,321,108 A | 6/1994 | Kunzler | |
| 5,331,067 A * | 7/1994 | Seidner et al. ................ | 525/479 |
| 5,331,073 A | 7/1994 | Weinshenk, II et al. | |
| 5,358,995 A | 10/1994 | Lai et al. | |
| 5,486,579 A | 1/1996 | Lai et al. | |
| 5,710,302 A * | 1/1998 | Kunzler et al. ................ | 556/434 |
| 5,760,100 A | 6/1998 | Nicolson et al. | |
| 5,770,669 A * | 6/1998 | Robertson et al. ............. | 526/279 |
| 5,776,999 A | 7/1998 | Nicolson et al. | |
| 5,789,461 A | 8/1998 | Nicolson et al. | |
| 5,849,811 A | 12/1998 | Nicolson et al. | |
| 5,945,498 A | 8/1999 | Hopken et al. | |
| 5,981,615 A * | 11/1999 | Meijs et al. .................... | 522/137 |
| 6,241,766 B1 | 6/2001 | Liao et al. | |
| 6,649,722 B2 | 11/2003 | Rosenzweig et al. | |
| 6,762,271 B2 | 7/2004 | Salamone et al. | |
| 6,815,074 B2 | 11/2004 | Aguado et al. | |
| 6,818,719 B2 * | 11/2004 | Fujisawa et al. ........... | 526/323.2 |
| 6,867,245 B2 * | 3/2005 | Iwata et al. .................... | 523/107 |
| 6,951,894 B1 | 10/2005 | Nicolson et al. | |
| 2002/0016383 A1 * | 2/2002 | Iwata et al. .................... | 523/106 |
| 2006/0004165 A1 | 1/2006 | Phelan et al. | |

(Continued)

OTHER PUBLICATIONS

Contact Lens Spectrum, Silicone Hydrogels: The Evolution of a Revolution (http://www.clspectrum.com/article/aspx?article=12952), issue date, Feb. 2006, 12 pages.*

Nicolson, Paul C, and Vogt, Jurgen, Soft contact lens polymers: an evolution, Biomaterials, (2001), 3273-3283, vol. 22, Elsevier Science Ltd.

Lai, Yu-Chin, and Valint, Paul L, Control of Properties in Silicone Hydrogels by Using a Pair of Hydrophilic Monomers, Journal of Applied Polymer Science, (1996), 2051-2058, vol. 61, John Wiley & Sons.

*Primary Examiner* — Randy Gulakowski
*Assistant Examiner* — Robert Loewe
(74) *Attorney, Agent, or Firm* — Albert Haegele; Leyendecker & Lemire, LLC

(57) ABSTRACT

Hydrogels, methods of preparing hydrogels, and ophthalmic lenses comprising hydrogels are described. Fully hydrated embodiments of the hydrogels have relatively high water content and oxygen permeability, along with relatively low modulus of elasticity. Embodiments of the hydrogels in substantially dehydrated condition are adapted to lathe cutting at or above room temperature. Embodiments of contact lenses made with the silicone hydrogels have low on-eye water loss.

35 Claims, No Drawings

U.S. PATENT DOCUMENTS

| | | | |
|---|---|---|---|
| 2006/0142524 A1* | 6/2006 | Lai et al. | 528/25 |
| 2006/0142525 A1* | 6/2006 | Lai et al. | 528/25 |
| 2007/0291223 A1* | 12/2007 | Chen et al. | 351/160 R |
| 2007/0296914 A1* | 12/2007 | Hong et al. | 351/160 H |
| 2008/0048350 A1* | 2/2008 | Chen et al. | 264/2.6 |
| 2008/0314767 A1* | 12/2008 | Lai et al. | 206/5.1 |
| 2009/0141234 A1 | 6/2009 | Blackwell et al. | |
| 2009/0176909 A1* | 7/2009 | Benz | 523/106 |

* cited by examiner

HYDROGELS AND METHODS OF MANUFACTURE

FIELD OF THE INVENTION

The present invention relates generally to hydrogels and biocompatible materials, such as ophthalmic lenses, comprising hydrogels.

BACKGROUND

Materials must meet demanding criteria in order to function well in a biocompatible role, where sustained intimate contact with a living organism is expected. Ophthalmic lenses must meet particularly demanding criteria, and materials from which lenses are made must therefore also possess a demanding combination of properties. Lens material must be sufficiently oxygen permeable to allow adequate oxygen to permeate through lenses to reach users' eyes. Lenses must be sufficiently physically robust to remain intact while worn in the user's eye, as well as during handling, installation, and removal. During wear, lens surfaces must be wettable, and must resist deposition of proteins, lipids, and other biological material. Lens material must also be highly transparent, and lenses that are soft or flexible are generally more comfortable to wear.

Some of the above characteristics are difficult to achieve simultaneously. Rigid ophthalmic lenses have good visual clarity and are generally sufficiently physically robust, but their high modulus makes them uncomfortable for some users to wear. Soft ophthalmic lenses have a lower modulus that makes them more comfortable to wear, but decreased modulus often comes at the expense of decreased tear strength. Moreover, soft ophthalmic lenses typically cover a larger area and conform closely to the contour of the surface of an eye than rigid ophthalmic lenses. Accordingly, soft ophthalmic lenses typically need to have sufficient oxygen permeability to avoid oxygen deprivation of wearers' eyes.

Ophthalmic lenses made of non-silicone hydrogels typically have moderate to high water content and, provided the lens is sufficiently thin, can be produced to have acceptable oxygen permeability along with desirable wettability. However, excellent oxygen permeability is difficult to attain with non-silicone hydrogels, and high water content hydrogels can be physically unstable, having a tendency to reduce in size with increases in temperature. In addition, thin lenses made from materials with high water content are also prone to dehydrate on the eye, which results in lower on-eye oxygen permeability and can also lead to serious clinical complications. For lathe cut lenses, which often have increased thickness compared to cast-molded lenses, oxygen transmissibility is often undesirably low.

Silicone hydrogels generally have higher oxygen permeability than non-silicone hydrogels, but high silicone content can result in increased modulus and poor surface properties that lead to poor wettability and deposition of biological material on lens surfaces. High silicone content material also tends to be difficult or impossible to lathe at or above room temperature, thereby making manufacture of ophthalmic lenses by lathing silicone hydrogel material impracticable. Silicone hydrogel material that has a $T_g$ at or near room temperature may nonetheless be difficult or impossible to lathe at room temperature because cutting the silicone hydrogel with a lathe can heat the material being cut. Lowering silicone content typically results in decreased oxygen permeability.

Ophthalmic lenses made from silicone hydrogels can achieve an adequate, albeit not optimal, balance of surface wettability and resistance to deposition, modulus of elasticity, tear resistance, and oxygen permeability. However, manufacturing silicone hydrogels and lenses therefrom introduces problems that are difficult or expensive to overcome. Moreover, it can be difficult to simultaneously achieve high oxygen permeability, low modulus and high wettability in silicone hydrogels, and it can be difficult to achieve high water content in silicone hydrogels that are high enough in silicone content to have desirable oxygen permeability. Finally, hydrogel lenses that have high water content tend to suffer from high water loss rates that result in undesirable dehydration of both lenses and wearers' eyes.

Silicone-containing monomers and hydrophilic monomers, from which silicone hydrogels are typically made, tend to resist dissolution and form separate phases in polymerization reaction mixtures comprising relatively high concentrations of hydrophilic and silicone-containing monomers. Manufacture of silicone hydrogels is thus complicated by the tendency of polymerization reaction mixtures to separate into relatively hydrophilic and hydrophobic phases, which can negatively impact polymerization and silicone hydrogel polymerization products. Silicone-containing monomers are often chemically modified to form prepolymers or macromers with relatively hydrophilic substituents that can be used in higher proportions than silicone-containing true monomers. Such silicone-containing prepolymers and macromers can be mixed more readily with hydrophilic monomers, helping to avoid phase separation in polymerization reaction mixtures comprising relatively high concentrations of these silicone containing species.

U.S. Pat. No. 4,711,943 (the Harvey patent) discloses silicone hydrogels comprising modified silicone-containing monomers, the modified silicone-containing monomers comprising a urethane linkage. Harvey discloses silicone hydrogels having fantastic putative physical properties. One example of silicone hydrogels disclosed in Harvey purportedly has a fully hydrated water content of 50.3%, oxygen permeability of 43 Barrers, and an extraordinary modulus of elasticity of $1.6 \times 10^{-6}$ dynes/cm$^2$ (see Sample A, Harvey Table XII). However, this modulus value is not credible. Persons of ordinary skill in the art recognize that $1.6 \times 10^{-6}$ dynes/cm$^2$ is an absurdly low modulus value, approximately 12 to 14 orders of magnitude below a reasonable number. Accordingly, it is tempting to suggest that the drafter of the Harvey patent was confused about the sign on the exponent, and the modulus value should be $1.6 \times 10^6$ dynes/cm$^2$. However, $1.6 \times 10^6$ dynes/cm$^2$ (0.16 MPa) is a very low modulus value for a silicone hydrogel, especially one comprising 43.38% N-[tris(trimethylsiloxy)silylpropyl]methacrylamide (TSMAA), leading persons of ordinary skill to reasonably surmise that the absolute value of the modulus exponent is incorrect as well as the sign.

Further evidence that modulus values disclosed in the Harvey patent are unfounded is shown in many other tables, and particularly in Table XIX, where modulus values of about $1.9 \times 10^{-10}$ dynes/cm$^2$ are disclosed in silicone compositions containing 35% to 40% TSMAA. Such values are inconceivably low. Other spurious physical parameter values, including values that make more sense if signs on exponents are reversed, appear endemic to the Harvey patent. However, it is beyond the scope of this application to trouble shoot the surfeit of errors in the Harvey patent.

In summary, the Harvey patent discloses modulus values that defy belief by persons of ordinary skill in the art. Accordingly, modulus figures disclosed in Harvey are not credible.

Nevertheless, Harvey discloses a silicone hydrogel embodiment with fully hydrated water content of 58.2% and oxygen permeability of 35.2 Barrers, and another silicone hydrogel embodiment with oxygen permeability of 58 and water content of 37.6%. These water content and oxygen permeability values are fully plausible.

U.S. Pat. No. 5,486,579 (the Lai patent) discloses silicone hydrogel compositions comprising silicone-containing monomers with urethane linkages. The silicone hydrogels disclosed in Lai have varied water content and modulus of elasticity that are adjusted by varying abundance of hydrophilic monomers, including N-vinyl pyrrolidone (NVP) and N,N-dimethyl acrylamide (DMA). Lai discloses silicone hydrogels with modulus values as low as 0.62 MPa (63 g/mm$^2$) at 37% fully hydrated water content (Table 1), but does not disclose any fully hydrated water content above about 46% (Table 1), and no modulus below 0.62 MPa.

Interestingly, the Lai patent claims modulus values as low as 0.05 MPa (5 g/mm$^2$ in claim 5 and 15), a remarkably low but not inconceivable value. However, Lai does not disclose to how a person of ordinary skill in the art might achieve such low modulus in silicone hydrogels. Moreover, it is not implicit that silicone hydrogel formulations such as those disclosed in Lai could achieve modulus values lower than those of the specific examples disclosed.

Conversely, the Lai patent suggests that silicone hydrogels preferably have oxygen permeability of Dk >60 Barrers (Lai column 6, lines 58-59). A person of ordinary skill in the art would recognize that Dk >60 Barrers is possibly an inherent quality in a silicone hydrogel composition such as disclosed in Lai, examples of which contain about 30%-47% TRIS (Lai columns 9 and 10). Lai does not, however, explicitly enable a person of ordinary skill in the art to make a silicone hydrogel with oxygen permeability >60 Barrers.

In summary, the Lai patent discloses silicone hydrogels with fully hydrated water content around 25% to 46% that also have modulus values of 0.62 MPa to 0.85 MPa (63 to 87 g/mm$^2$). Lai does not disclose how a person of ordinary skill in the art can make a silicone hydrogel with a modulus below 0.62 MPa, and embodiments of hydrogels and processes for making hydrogels exemplified in Lai do not implicitly achieve the low modulus claimed in Lai claims 5 and 15. Lai arguably does implicitly disclose silicone hydrogel compositions with Dk >60 Barrers.

U.S. Pat. No. 6,649,722 (the Rosenzweig patent) discloses silicone hydrogel compositions that achieve relatively high oxygen permeability (Dk=117 Barrers) at moderately low water content (32%), and lower oxygen permeability (88 Barrers) at higher water content (46%). Rosenzweig discloses silicone hydrogels with water content as high as 53%, but does not disclose a Dk value for 53% water content silicone hydrogel. The Rosenzweig disclosure shows a loose inverse correlation between water content and oxygen permeability in the Rosenzweig silicone hydrogels. Rosenzweig also discloses numerous silicone hydrogels that comprise styrene or substituted styrene.

United States Patent Application No. 2006/0004165 (the Phelan application) discloses silicone hydrogel compositions that are prepared from reaction mixtures comprising urethane macromers and styrene or substituted styrene monomers. Examples of silicone hydrogel material disclosed in Phelan have oxygen permeability ≧65 Barrers and glass transition temperatures ($T_g$) in a 60-68° C. range. Interestingly, Phelan discloses room temperature lathability and associated property $T_g$ of 60° to 68° in silicone hydrogels comprising styrene or substituted styrenes that are remarkably similar to silicone hydrogels comprising styrene or substituted styrene disclosed in Rosenzweig.

Collectively, prior art silicone hydrogels have not been able to achieve fully hydrated water content ≧60%. Moreover, prior art hydrogels have not achieved lathability at or above room temperature without the use of urethane macromers and styrene monomers. In addition, prior art references have not disclosed silicone hydrogels with combined physical properties of water content >50%, oxygen permeability >45 Barrers, contact angle <90°, and modulus <1.0 MPa.

DETAILED DESCRIPTION

Embodiments of the present invention comprise biocompatible material adapted to be in relatively sustained, intimate, contact with sensitive tissue of living organisms. Embodiments of hydrogels have properties including oxygen permeability (Dk) greater than 45 Barrers, modulus of elasticity less than 1.0 MPa, contact angle (a measure of wettability) of less than 90°, and fully hydrated water content greater than 60%. Some hydrogels are sufficiently rigid in a substantially dehydrated state to be lathable at or above room temperature. Embodiments include hydrogels with a Shore D hardness of 70 or greater at 21° C., or with $T_g$ at or above room temperature. Variations of ophthalmic lenses made from silicone hydrogel embodiments have on-eye water loss of less than 3%. On-eye water loss refers to a decrease in water content of an ophthalmic lens that occurs when the ophthalmic lens is worn on a user's eye during an interval of 8 hours or more.

Embodiments of hydrogels contemplated in the present invention comprise silicone hydrogel copolymers. Some silicone hydrogel copolymers comprise at least two different monomer types from a group of monomers comprising a silicone-containing monomer, a hydrophilic monomer, and a fluorine-containing monomer. Variations of silicone hydrogels further comprise intra-molecular or inter-molecular cross-linking among or between silicone hydrogel polymers, and some silicone hydrogels comprise 2 or more different species of hydrophilic monomer. Variations of hydrogels comprise compounds employed to change or enhance the color of ophthalmic lenses or other hydrogel products, and some embodiments comprise compounds employed for their UV absorbing properties.

Embodiments of hydrogels and ophthalmic lenses disclosed and claimed herein do not require surface treatment in order to achieve the disclosed or claimed physical properties such as modulus, oxygen permeability, oxygen transmissibility, water content, or wetting angle.

Embodiments of hydrogels further comprise a first polymer comprising a silicone-containing monomer, the first polymer being in molecular entanglement with a second polymer. The second polymer may or may not comprise a silicone-containing monomer. The first polymer is typically in molecular entanglement with a second polymer through formation of an interpenetrating network (IPN). The IPN may be formed through sequential IPN, simultaneous IPN, or other IPN techniques.

Embodiments of silicone hydrogels further comprise polymerization reaction products of a reaction mixture, the reaction mixture comprising at least two different types of monomers from a monomer group comprising a silicone-containing monomer, a hydrophilic monomer, and a fluorine-containing monomer, as well as a cross-linker and an initiator. Reaction mixtures may comprise two or more different species of hydrophilic monomer. Silicone hydrogel polymerization reaction mixtures typically comprise monomers that have a polymerization prone reactive functional group, such as a vinyl group, that facilitates polymerization.

Some embodiments of silicone hydrogel reaction mixtures are substantially free of silicone-containing prepolymers or silicone-containing macromers, and some variations are substantially free of end-capped or other derivatized monomers. Monomers that have not participated in a polymerization or pre-polymerization reaction, and therefore have not been transformed into prepolymers or macromers, are referred to here as true monomers.

Embodiments of silicone-containing monomers include, but are not limited to, bulky silyl monomers. For the purposes of this application, bulky silyl monomers consist of compounds having the following general formula [I],

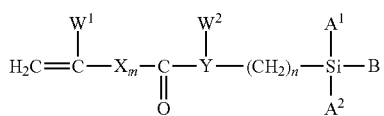

where $W^1$ is $CH_3$ or H; $W^2$ is $CH_3$ or H; l is 0 where Y is O (oxygen) and l is 1 where Y is N (nitrogen); m is 0 or 1; n is an integer from 1 to 6, inclusive; Y is O or N; X is selected from the group consisting of the following formulas [II],

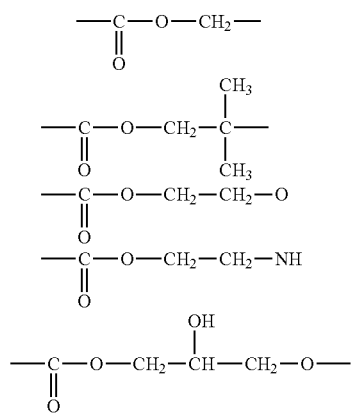

$A^1$, and $A^2$, and are the same or are different and are selected from the group consisting of trialkyl siloxy and lower alkyl functional groups; and B is selected from the group consisting of the following formula [III],

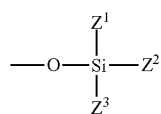

where $Z^1$, $Z^2$, and $Z^3$ are the same or are different and are selected from the group consisting of phenyl, benzyl, trialkyl siloxy, and lower alkyl functional groups.

Silicone-containing monomers further comprise monomers having one or more alkyl siloxy functional groups. An example of a silicone-containing monomer that is a bulky silyl monomer and is also a monomer having one or more alkyl siloxy functional group is 3-(tris(trimethylsiloxy)silyl) propyl methacrylate (Tris), having the following formula [IV],

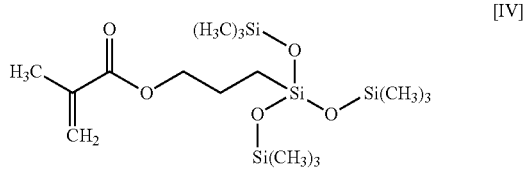

Other silicone-containing monomers include, but are not limited to, tris(trimethylsiloxy)silylpropyl methacryloxyethyl carbamate, N-tris(trimethylsiloxysilylpropyl)acrylamide, and 1,3-bis(methacrylamidopropyl)1,1,3,3,-tetrakis (trimethylsiloxy)disiloxane, methacryloxyalkylsiloxanes, 3-methacryloxy propylpentamethyldisiloxane, bis(methacryloxypropyl)tetramethyldisiloxane, monomethacrylated polydimethylsiloxane, and monoacrylated polydimethylsiloxane. Embodiments of silicone-containing monomers include other silicone-containing monomers, including true monomers and other monomers.

Hydrophilic monomers include, but are not limited to, N,N-dimethyl acrylamide (DMA), having the following formula [V],

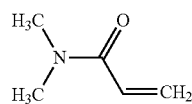

2-hydroxyethyl methacrylate (HEMA), having the following formula [VI],

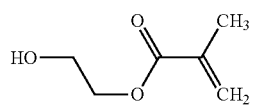

2-hydroxyethyl acrylate, hydroxypropyl acrylate, hydroxypropyl methacrylate, N-vinyl-N-methylacetamide, N-vinyl-2-pyrrolidone, glycerol methacrylate, acrylic acid, acrylamide, methacrylic acid, and other hydrophilic monomers.

Fluorine-containing monomers include, but are not limited to, 1,1,1,3,3,3-hexafluoroisopropyl methacrylate (HFPM), having the following formula [VII],

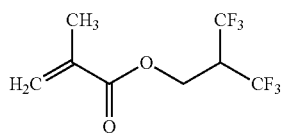

2,2,2-trifluoroethyl methacrylate, pentafluoroethyl acrylate, pentafluoroethyl methacrylate, hexafluoroisopropyl acrylate, and other fluorinated monomers.

Cross-linkers include, but are not limited to, 1,6,-hexanediol diacrylate (HDDA), having the following formula [VIII],

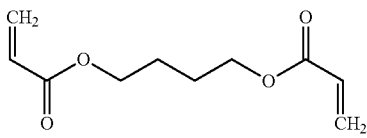

[VIII]

ethylene glycol dimethacrylate, diallylmaleate, triethyleneglycol dimethacrylate, allyl methacrylate, and other cross-linkers.

Initiators include thermal initiators such as, but not limited to, azo-iso-butyronitrile (AIBN), shown in the following formula [IX],

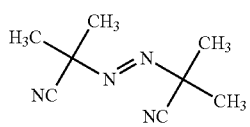

[IX]

benzoyl peroxide, and azobisvaleronitrile, and UV initiators such as, but not limited to, 2-hydroxy-2-methyl-1-phenyl-1-propanone.

Embodiments may also comprise strengthening monomers, such as, but not limited to, methyl methacrylate, ethyl methacrylate, hexyl methacrylate, cyclohexyl methacrylate, ethoxyethyl methacrylate, other methacrylates, and other strengthening monomers. Addition or incorporation of strengthening monomers into a polymer or copolymer usually reinforces the polymeric material to increase mechanical properties such as tensile strength.

Embodiments of the present invention comprise methods of preparing silicone hydrogels including both solvated and non-solvated polymerization reactions. Variations of solvated polymerization reactions include reaction mixtures comprising a non-participating solvent. A non-participating solvent serves at least in part to solvate other reaction mixture components, such as monomers, cross-linkers, and initiators, but non-participating solvent molecules are not incorporated into a polymer. A non-participating solvent may serve another role in addition to solvation, including acting as a hydrogen donor or acceptor.

Variations of ophthalmic lenses are produced by casting silicone hydrogels in molds, and some ophthalmic lenses are lathed from silicone hydrogel material cast in bulk shapes such as, but not limited to, buttons, bonnets, pseudo bonnets, rods, cylinders, or semi-finished lenses. Some lenses are lathed at room temperature or greater. Lathable bulk silicone hydrogel material is typically, but not necessarily, produced from a polymerization reaction mixture that is substantially free of non-participating solvent. In contrast, cast-molded lenses are typically produced from a solvated polymerization reaction mixture. A solvated polymerization reaction mixture comprises a non-participating solvent, the non-participating solvent being present in the reaction mixture, at least in part to facilitate dissolution of other reaction mixture components, but not becoming a constituent in a polymer product.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning "either or both."

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct connection between the identified elements, components, or objects. Often the manner of the coupling will be related specifically to the manner in which the two coupled elements interact.

The term "hydrogel," as used in this specification and appended claims, refers to a polymerization product of one or more hydrophilic monomers, the polymerization product being adapted to comprise at least 10% by weight water when fully hydrated.

The term "silicone hydrogel," as used in this specification and appended claims, refers to a hydrogel that is the polymerization product of one or more silicone-containing monomers, a proportion of the silicone hydrogel comprising the silicone-containing monomer being at least 0.5% by weight.

The term "alkyl siloxy functional group" or "alkyl siloxy group," as used in this specification and appended claims, refers to a substituent comprising a silicone atom directly bonded to at least one oxygen atom and at least one alkyl group, the alkyl group having the general formula $C_nH_{2n+1}$. Examples of alkyl siloxy functional groups have the following formulas [X],

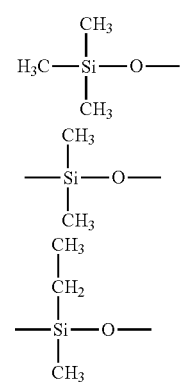

[X]

The term "lower alkyl group" or "lower alkyl functional group," as used in this specification and appended claims, refers to an alkyl substituent having the general formula $C_nH_{2n+1}$, where n is an integer from 1 to 6, inclusive.

The term "substantially free," as used in this specification and appended claims, refers to a reaction mixture or polymer composition that comprises less than 2% of the component to which the term "substantially free" refers. For instance, a reaction mixture that is substantially free of silicone-containing prepolymers comprises less than 2% by weight silicone-containing prepolymers; that is, silicone containing prepolymers contribute less than 2% to the weight of the reaction mixture. Similarly, a reaction mixture that is substantially free of silicone-containing non-participating solvent comprises less than 2% by weight non-participating solvent; that is, non-participating solvent contributes less than 2% to the weight of the reaction mixture. As used herein, substantially free does not apply to cross-linking agents or initiators because those reaction mixture components are routinely used in relatively small quantities. Thus a reaction mixture that comprises 0.10% AIBN (a thermal initiator) and 0.75% HDDA (a cross-linker) are not substantially free of AIBN or HDDA.

The term "ophthalmic lens," as used in this specification and appended claims, refers to a lens adapted to be placed or worn in intimate contact with a user's eye, or, more typically, in intimate contact with a tear film or other liquid film that usually resides between an ophthalmic lens and a user's eye. Examples of ophthalmic lenses include, but are not limited to, contact lenses for vision correction, therapeutic lenses, protective lenses, cosmetic lenses, and drug delivery devices.

The term "fully hydrated," as used in this specification and appended claims, refers to compositions that are substantially in equilibrium with water, a buffered solution that approximates physiological pH and ionic strength, a buffered solution that approximates a human ocular environment, or a human ocular environment. Thus, where modulus of elasticity or oxygen permeability is measured, a fully hydrated hydrogel material is equilibrated with water or the appropriate aqueous solution. Ophthalmic lenses comprising hydrogel material are typically stored in buffered aqueous saline solution, pH about 7.4, or in 0.9% NaCl aqueous solution.

The term "substantially dehydrated," as used in this specification and appended claims, refers to hydrogel compositions within which less than 1% water by weight resides. As used in this application, $T_g$, Shore D hardness, and lathability apply to hydrogel material that is substantially dehydrated, unless otherwise specified.

The term "true monomer," as used in this specification and appended claims, refers to monomers that have not been polymerized or pre-polymerized. True monomers are not part of a polymer, prepolymer, or macromer. For the purposes of this specification and appended claims, molecules containing more than 6 repeating subunits such as dimethylsiloxane, or with molecular weights greater than 1000, are considered polymers, prepolymers, or macromers, and are therefore not "true monomers."

The term "monomer," as used in this specification and appended claims, refers to a compound adapted to polymerize (or copolymerize with other monomers), under polymerization reaction conditions. As used in this application, the term monomer includes end-capped and other derivatized monomers, prepolymers, and macromers. After incorporation into a polymer, a monomer is still referred to as a monomer. Persons of ordinary skill in the art recognize that a monomer that is incorporated into a polymer or prepolymer is chemically modified by incorporation, such that the incorporated monomer is not identical to the unincorporated monomer.

The terms "reaction mixture," or "polymerization reaction mixture," as used in this specification and appended claims, refers to any combination of reaction components, including, but not limited to, monomers and other reactants, solvents, catalysts, initiators, cross-linkers, color additives, or UV absorbers that are combined, mixed, or blended under conditions that result in a polymerization reaction. The reaction mixture may be a liquid, gas, or solid phase, and may comprise a solution, heterogeneous mixture, homogeneous mixture, emulsion, suspension, other composition, or mixtures thereof.

The term "approximately," as used in this specification and appended claims, refers to plus or minus 10% of the value given. For example: "approximately 25.0% VP" means a range of VP content from 22.5% to 27.5%; "approximately 0.010% component X" means a range of compound X from 0.009% to 0.011%; and "approximately 50 g" means a range from 45 g to 55 g.

The term "about," as used in this specification and appended claims, refers to plus or minus 20% of the value given.

The term "lathable," as used in this specification and appended claims, refers to a composition that is adapted to be cut with a lathe to produce a serviceable ophthalmic lens, or to generate a product that can be polished to produce a serviceable ophthalmic lens. Thus a lathable silicone hydrogel blank can be cut with a lathe to produce an ophthalmic lens without substantial burns or surface rips, and that has at most only minor surface imperfections that can be substantially removed by polishing. In order to be serviceable, a lathed contact lens must have substantially high quality optics. Unless otherwise specified, lathability refers to hydrogel material that is substantially dehydrated. A composition that is lathable at or above room temperature is adapted to be cut with a lathe in an environment with ambient temperature at 20° C. to 23.5° C. (room temperature) or above 23.5° C. (above room temperature). It is appreciated by a person of ordinary skill in the art that hydrogel material being cut with a lathe typically gets substantially hotter than ambient temperature, especially proximate the interface between a cutting edge and the hydrogel material. Thus a hydrogel material being cut with a lathe in an environment with an ambient temperature of 23.5° C. typically gets much hotter than 23.5° C. at the cutting edge interface, possibly higher than 40° C. A hydrogel material that is lathable at or above room temperature can be lathed without temperature considerations such as a refrigerated environment or chilled tooling or chilled chuck.

The terms "polymer" and "copolymer" are used interchangeably in this specification and appended claims, and refer to a polymer comprising one or more specie of monomer. As used here, polymers and copolymers are molecules comprising repeating structural units that are linked by covalent bonds, the repeating structural units being monomers.

The term "modulus of elasticity" or "modulus," as used in this specification and appended claims, refers to Young's modulus of elasticity, a standard measure of elasticity known to persons of ordinary skill in the art. The unit for expressing "modulus" or "modulus of elasticity" is the pascal (Pa), a unit known to persons of ordinary skill in the art (1 pascal=1 N/m2, where N=Newton and m=meter). A practical unit used in this application is the megapascal (MPa; 1 MPa=1×10$^6$ Pa). 1 MPa is approximately equal to 102 g/mm$^2$ or 1×10$^7$ dynes/cm$^2$. As it pertains to this application, modulus is measured and expressed for fully hydrated hydrogel material, unless otherwise specified.

The term "contact angle," as used in this specification and appended claims, refers to an index of surface wetting known to persons of ordinary skill in the art. It is sometimes referred to as advancing contact angle. As it pertains to this application, contact angle is measured and expressed for fully hydrated hydrogel material, unless otherwise specified.

The term "oxygen permeability," as used in this specification and appended claims, is abbreviated Dk, and is expressed in Barrers (1 Barrer=10$^{-11}$ cm$^2$·mL O$_2$/cm$^3$·second·mmHg.

As it pertains to this application, oxygen permeability is measured and expressed for fully hydrated hydrogel material, unless otherwise specified.

The term "oxygen transmissibility," as used in this specification and appended claims, is abbreviated Dk/t, where t is a thickness of a hydrogel film or ophthalmic lens. Dk/t is expressed $\times 10^{-9}$ cm·mLO$_2$/cm3·second·mmHg. Thus a lens made of material with an oxygen permeability of 60 Barrers and a thickness of 0.008 cm has oxygen transmissibility of $60 \times 10^{-11}$ (cm$^2$·mL O$_2$/cm$^3$·second·mmHg)/0.008 cm=75$\times$ 10$^{-9}$ cm·mLO$_2$/cm3·second·mmHg. Because Dk/t is expressed X $10^{-9}$ cm·mLO$_2$/cm$^3$·second·mmHg, Dk/t for the aforementioned lens is 75.

The term "room temperature," as used in this specification and appended claims, refers to a temperature range of 20° C. to 23.5° C. Above room temperature is therefore above 23.5° C.

The term "interpenetrating network," "interpenetrating networks," "IPN," and "IPNs," as used in this specification and appended claims, refers to a combination of two or more polymers in network form, at least one of which is polymerized or cross-linked in the immediate presence of the other.

Analytical Methods

Analytical methods for assessing physical properties of hydrogel materials and ophthalmic lenses are described below.

Modulus

Mechanical properties are determined by tensile testing of material using a Zwick Z0.5 tensiometer equipped with a KAD-Z 100N load cell. The jaws of the tensiometer are set to 10 mm separation, and test speed to 10 mm/min.

Test strips are prepared by first machining flat disks with a constant thickness of 0.20 mm from standard contact lens blanks. The disks are hydrated in buffered saline and autoclaved. Strips with a width of 3.0 mm are cut from the hydrated disks and individually mounted between the jaws of the tensiometer. The strip being tested is held under tension, and applied force is gradually increased until the sample breaks. The modulus of elasticity is determined from a graphical plot of stress vs. strain over the elastic region of the curve. For each material a minimum of 5 strips are tested, and the results averaged.

Water Content

Water content by weight is determined using a procedure based upon guidance specified in the following standard. ISO 18369-4:2006 Ophthalmic Optics—Contact lenses—Part 4: Physiochemical properties of contact lens materials. Specifically, this corresponds to section 4.6.2 Gravimetric determination of water content of hydrogel lens by loss on drying using an oven. After accurate weighing of the finished contact lens, the hydrated lenses are dried to constant mass in an oven and weighed again. The equilibrium water content (EWC) is expressed as:

$$EWC = \frac{\text{Weight of water in hydrated gel}}{\text{Total weight of hydrated gel}} \times 100$$

Oxygen Permeability

Oxygen permeability is measured in fully hydrated hydrogel material in aqueous solution at 35° C. The oxygen permeability is measured using the procedure outlined in the following standard. ISO 18369-4:2006 Ophthalmic Optics—Contact lenses—Part 4: Physiochemical properties of contact lens materials. This corresponds to section 4.4 Oxygen Permeability and more specifically section 4.4.3 Polarographic method. Measurements were made using an O$_2$ Permeometer Model 201T supplied by the Rehder Development Company, California, USA.

For each material to be measured a minimum of 4 plano contact lenses of constant thickness and different centre thicknesses (t) ranging from 0.10 to 0.30 mm are prepared following normal lens manufacturing methods. For each lens an initial oxygen transmissibility (Dk/t) measurement is determined, and then corrected for edge effects by application of a numerical method described in ISO 18369-2004. To correct for boundary effects, the reciprocal of the corrected oxygen transmissibility's of each of the lenses is plotted against t. The inverse of the gradient of the least squares best fit of the line is equal to the corrected Oxygen Permeability (Dk) of the material. Plano is a lens with zero power and as such does not provide any visual correction. Dk measurements are performed on plano lenses because the front and back surfaces are parallel to each other. Consequently the lens is of constant thickness over the area the measurement is being taken from.

As described by ISO 18369-2004 the equipment is calibrated using reference materials obtained from the Oxygen Permeability Reference Material Repository at the University of Alabama, Birmingham, USA. The corrected Dk of 4 reference materials with Oxygen Permeability in the range of 26-130 Barrers are determined by the method described above, and then used to construct a calibration curve from which a linear regression is derived.

The calibrated and corrected Dk of an unknown sample can then be derived by application of the linear regression to the corrected Dk initially measured.

Shore D Hardness

Shore D Hardness is measured using a calibrated Shore Scale Durometer Hardness Tester supplied by Bowers Metrology, UK. A trimmed blank of material is placed in line with the needle on the durometer. The blank is moved up as quickly as possible without shock towards the needle on the durometer, raising the weight until the needle on the dial will not move any further. The handle is held in this position for one second and the reading recorded. A minimum of 4 measurements are taken for each material and averaged.

Contact Angle

Contact angle is determined using the sessile drop technique. A hydrogel lens to be measured is placed on a dome support and the front surface blotted dry with a lint free tissue. A 2.0 μL drop of distilled water is placed on the surface of the material being measured, and a digital image of the drop is captured. The contact angle is measured from the image and is the angle that the drop of water makes with the surface. The angle at both sides of the drop is measured and averaged.

On-Eye Water Loss

Water loss during wear is determined using an Atago handheld refractometer, model CL-1. The refractometer is calibrated at 20° C. using saturated salt solution. The plate of the refractometer is opened and a drop of oil placed on the prism. The plate is then closed so that the standard solution covers the whole prism. The eyepiece is focused to produce a crisp image, and the position of the interface between the white and blue portions in the field of view adjusted to the S20 position.

Water content of an ophthalmic lens is measured by opening the plate and placing the lens convex side down on the prism. The plate is carefully closed, flattening the lens onto the prism. Light pressure is applied and water content of the lens is read from the scale viewed through the eyepiece.

Water loss during wear is determined by first taking a base water content measurement from a fully hydrated lens, fresh from its vial at room temperature (20° C. to 23.5° C.). The lens is then worn for a minimum of 8 hours. Immediately following removal of the lens from the eye, water content is measured again, and the difference between the two measurements provides an estimate of water loss from the lens during wear.

The on-eye water loss measuring method reported here utilizes baseline water content measurement at room temperature, and final, after-wear water content measurement at higher temperature, the after-wear measurement being made on a lens that is heated to about 35° C. during wear. Because water content of a hydrogel lens at 35° C. is less than room temperature, this on-eye water loss measuring method overestimates on-eye water loss.

On-eye water loss data was collected over a period of 1 month in a variety of environments, and the values measured were averaged. Ambient temperatures were 15-22° C. and relative humidity was approximately 60%.

Glass Transition Temperature ($T_g$)

Differential Scanning Calorimetry (DSC) analysis technique familiar to persons of ordinary skill in the art was performed using a DSC2920 (TA Instruments) to measure the thermal properties of the samples. The samples were loaded into open aluminum pans, heated to 130° C., and maintained at that temperature for 30 mins to ensure complete dehydration. The temperature was then ramped from 130° C. to 25° C. in order to determine the $T_g$.

A First Method of Making a Silicone Hydrogel

A first method of making a silicone hydrogel embodiment comprises making a reaction mixture by combining the following compositions:

a silicone-containing monomer in an amount of preferably 2.5 g to 30 g, more preferably 5.0 g to 20 g, and most preferably 7.5 g to 15 g; and a first hydrophilic monomer in an amount of preferably 0 g to 90 g, more preferably 20 g to 80 g, and most preferably 40 g to 65 g; and a second hydrophilic monomer in an amount of preferably 0 g to 60 g, more preferably 7.5 g to 45 g, and most preferably 15 g to 30 g; and a third hydrophilic monomer in an amount of preferably 0 g to 37 g, more preferably 0 g to 27 g, and most preferably 0 g to 22 g; and a fluorine-containing monomer in an amount of preferably 1.0 g to 10 g, more preferably 2.0 g to 8.0 g, and most preferably 4.0 g to 6.0 g; and a cross-linker in an amount of preferably 0 g to 3.75 g, more preferably 0.20 g to 2.0 g, and most preferably 0.30 g to 1.0 g; and a thermal initiator in an amount of preferably 0 g to 1.0 g, more preferably 0 g to 0.50 g, and most preferably 0 g to 0.20 g of a thermal initiator.

The first method reaction mixture is substantially free of non-participating solvent.

Other methods of making silicone hydrogels contemplated as within the scope of the present invention consist of, or consist essentially of, making a reaction mixture by combining the compositions named above. Some methods of making silicone hydrogels use reaction mixtures that comprise a UV initiator or other free radical initiator in addition to or in place of a thermal initiator, and some methods use reaction mixtures comprising non-participating solvents.

The reaction mixture of the first method is mixed and dispensed into molds, which are maintained at between 37° C. and 75° C. for at least 2 hours. The resulting silicone hydrogel is removed from the molds treated under reduced pressure for at least 1 hour at a temperature greater than 37° C.

Some ophthalmic lenses are made by casting the silicone hydrogels directly in lens molds. Other ophthalmic lenses are made by casting silicone hydrogels into bulk shapes or blanks, from which contact lenses are formed through cutting such as lathe cutting. Typically, but not necessarily, bulk or blank hydrogel material from which lenses are cut or lathed is prepared from reaction mixtures that are substantially free of non-participating solvent. Other methods of making silicone hydrogel embodiments use reaction mixtures comprising appreciable levels of non-participating solvents.

EXAMPLE 1

Example 1 exemplifies the first method of making a silicone hydrogel, and comprises making a reaction mixture by combining the following reactants: approximately 10.0 g 3-(tris(trimethylsiloxy)silyl)propyl methacrylate (Tris); approximately 59.25 g N,N-dimethyl acrylamide (DMA); approximately 25.0 g N-vinyl-2-pyrrolidone (VP); approximately 5.0 g 1,1,1,3,3,3-hexafluoroisopropylmethacrylate (HFPM); approximately 0.75 g 1,6-hexanediol diacrylate (HDDA); and approximately 0.10 g azo-iso-butyronitrile (AIBN). Other examples of the first method of making a silicone hydrogel consist of, or consist essentially of, making a reaction mixture by combining the Example 1 reactants listed above.

The example 1 reaction mixture is thoroughly mixed and subsequently dispensed into cylindrical molds, which are sealed and placed in a water bath at approximately 60° C. for approximately 24 hours. The resulting silicone hydrogel cylinders are removed from the molds and maintained under reduced pressure for approximately 16 hours at 110° C.

A First Embodiment Silicone Hydrogel

A first embodiment silicone hydrogel comprises a copolymer comprising the following:

a silicone-containing monomer in a proportion of preferably 2.5% to 30%, more preferably 5.0% to 20%, and most preferably 7.5% to 15%; and a first hydrophilic monomer in a proportion of preferably 0% to 90%, more preferably 20% to 80%, and most preferably 40% to 65%; and a second hydrophilic monomer in a proportion of preferably 0% to 60%, more preferably 7.5% to 45%, and most preferably 15% to 30%; and a third hydrophilic monomer in a proportion of preferably 0% to 37%, more preferably 0% to 27%, and most preferably 0% to 22%; and a fluorine-containing monomer in a proportion of preferably 0% to 10 g, more preferably 2.0% to 8.0%, and most preferably 4.0% to 6.0%; and a cross-linker in a proportion of preferably 0% to 3.75%, more preferably 0.20% to 2.0%, and most preferably 0.30% to 1.0%.

Other embodiments of silicone hydrogels contemplated as within the scope of the present invention include silicone hydrogels consisting of, or consisting essentially of, first embodiment components listed above.

The first embodiment silicone hydrogel is prepared using the first method of making a silicone hydrogel. Other embodiments of the present invention are prepared using other methods of making silicone hydrogels.

In substantially dehydrated condition, variations of first embodiment silicone hydrogels are lathable preferably at temperatures at or above room temperature, more preferably at temperatures above 25° C., even more preferably at temperatures above 27° C. most preferably at temperatures between 27° and 58° C. Some variations of hydrogels have a $T_g$ preferably at or above room temperature, more preferably above 25° C., even more preferably above 27° C., even more preferably still above 40° C., and most preferably above 70° C. Some variations of hydrogels have Shore D hardness that is preferably greater than 70 at 21° C., and more preferably greater than 80 at 21° C.

Fully hydrated, first embodiment silicone hydrogels can have oxygen permeability of preferably greater than 45 Barrers, and most preferably greater than 55 Barrers. Some variations of first embodiment silicone hydrogels have a contact angle of less than 90°, and a modulus of preferably less than 1.0 MPa, more preferably less than 0.70 MPa, and most preferably less than 0.45 MPa. Variations of the first embodiment silicone hydrogels have a tensile strength of preferably greater than 0.14 MPa and most preferably greater than 0.20 MPa.

EXAMPLE 2

Example 2 is a silicone hydrogel that exemplifies the first embodiment silicone hydrogel, and comprises the following proportions of components: Approximately 10.0% Tris; approximately 59.25% DMA; approximately 25.0% VP; approximately 5.0% HFPM; and approximately 0.75% HDDA. Some examples of silicone hydrogels contemplated within the scope of the present invention consist of, or consist essentially of, the Example 2 components listed above.

Example 2 is prepared using the example 1 method of making a silicone hydrogel. Other embodiments of the present invention are prepared using other methods, Example 2 silicone hydrogel in a substantially dehydrated condition is lathable at or above room temperature, having a Shore D hardness of approximately 84 at 21° C. and a $T_g$ of 108 to 116° C.

Example 2 silicone hydrogel in a fully hydrated condition has a fully hydrated water content of approximately 74%, an oxygen permeability of approximately 60 Barrers, a contact angle of approximately 85°, a modulus of approximately 0.39 MPa, and a tensile strength of approximately 0.23 MPa.

EXAMPLE 3

Example 3 is a silicone hydrogel that exemplifies the first embodiment silicone hydrogel copolymer and comprises the following proportions of components: approximately 10.0% Tris; approximately 45.75% DMA; approximately 20.0% VP; approximately 18.5% 2-hydroxyethyl methacrylate (HEMA); approximately 5.0% HFPM; and approximately 0.75% HDDA. Some examples of silicone hydrogels contemplated within the scope of the present invention consist of, or consist essentially of, the Example 3 components listed above.

Example 3 silicone hydrogel in a fully hydrated condition has a water content of approximately 66%, an oxygen permeability of approximately 53 Barrers, and a contact angle of approximately 85°.

Table 1 displays compositions and physical properties of numerous examples of the second embodiment silicone hydrogel. Examples 2 and 3 are the only hydrogels in Table 1 that achieve Dk >45, water content >60%, and contact angle <90%. Moreover, example 2 exhibits a relatively low modulus of 0.39 MPa. Example 3 presumably also has a modulus less than 0.7 MPa, but the modulus of example 3 was not measured. First embodiment silicone hydrogel examples displayed in Table 1 show a positive correlation between water content and oxygen permeability, which facilitates achieving sometimes conflicting goals of relatively high oxygen permeability in a relatively wettable ophthalmic lens.

TABLE 1

| | Ex. 2 | Ex. 3 | Ex. 6 | Ex. 7 | Ex. 8 | Ex. 9 | Ex. 10 |
|---|---|---|---|---|---|---|---|
| Component (%) | | | | | | | |
| Tris | 10.0 | 10.0 | 10.0 | 10.0 | 10.0 | 20.0 | 30.0 |
| DMA | 59.25 | 45.75 | 24.25 | 36.25 | 84.25 | 59.25 | 59.25 |
| HEMA | 0 | 18.5 | 40 | 28 | 0 | 0 | 0 |
| VP | 25.0 | 20 | 20 | 20 | 0 | 15 | 5 |
| HFPM | 5.0 | 5.0 | 5.0 | 5.0 | 5.0 | 5.0 | 5.0 |
| HDDA | 0.75 | 0.75 | 0.75 | 0.75 | 0.75 | 0.75 | 0.75 |
| Property | | | | | | | |
| Dk (Barrers) | 59 | 53 | 44 | 51 | NA | 57 | 66 |
| Water Content* | 74 | 66 | 54 | 62 | NA | 67 | 59 |
| C.A.** | 85 | 85 | 105 | 95 | NA | 93 | 111 |
| Modulus (MPa) | 0.39 | ND | ND | ND | NA | 0.44 | 0.44 |

NA = not applicable; reaction terminated because separate phases formed in reaction mixture
ND = not determined
* % water by weight
** contact angle, in degrees Table 2 illustrates effects of altering proportions of hydrophilic monomers DMA and VP, while keeping total hydrophilic monomer abundance constant at 64.25%, in a silicone hydrogel comprising 30% Tris. Lowering DMA content while raising VP content has the desirable effect of reducing contact angle, but at the cost of raising modulus. Thus where contact angle is reduced to a desirable range below 90° in example 17, modulus is undesirably high at 5.57 MPa. Conversely, where modulus is in a desirable range below 1.0 MPa (examples 11-15), contact angle is in an undesirable range above 90°. Table 2 shows that desirable physical parameters of Dk >45, modulus <1.0 MPA, contact angle <90°, and water content >60%, were not achieved in silicone hydrogels comprising 30% Tris and various proportions of DMA and VP whose total hydrophilic monomer abundance was 64.25%.

TABLE 2

| | Ex. 11 | Ex. 12 | Ex. 13 | Ex. 14 | Ex. 15 | Ex. 16 | Ex. 17 |
|---|---|---|---|---|---|---|---|
| Component (%) | | | | | | | |
| Tris | 30.0 | 30.0 | 30.0 | 30.0 | 30.0 | 30.0 | 30.0 |
| DMA | 54.25 | 44.25 | 34.25 | 24.25 | 14.25 | 9.25 | 4.25 |
| VP | 10 | 20 | 30 | 40 | 50 | 55 | 60 |
| HFPM | 5.0 | 5.0 | 5.0 | 5.0 | 5.0 | 5.0 | 5.0 |
| HDDA | 0.75 | 0.75 | 0.75 | 0.75 | 0.75 | 0.75 | 0.75 |
| Property | | | | | | | |
| Dk (Barrers) | 60 | 61 | 63 | 64 | 59 | 60 | 59 |
| Water Content* | 58 | 57 | 57 | 57 | 58 | 56 | 52 |
| C.A.** | 115 | 110 | 110 | 108 | 95 | 95 | 80 |
| Modulus (MPa) | 0.49 | 0.57 | 0.59 | 0.68 | 0.97 | 1.96 | 5.57 |

* % water by weight
** contact angle, in degrees

A Second Method of Making an Ophthalmic Lens

A second method of making an ophthalmic lens comprises machining blanks from first embodiment silicone hydrogel material. Convex lens shapes are cut from blanks with a lathe, and are subsequently hydrated and sterilized. Second method lathe cutting is performed at ambient temperatures at or above room temperature.

Other methods of making an ophthalmic lens comprise molding the lenses directly, rather than forming bulk material from which lenses are cut. Typically, but not necessarily, molded lenses are made using silicone hydrogel reaction mixtures comprising non-participating solvents.

EXAMPLE 4

Example 4 is a method of making an ophthalmic lens that exemplifies the second method of making an ophthalmic lens. In example 4, cylinders of example 2 silicone hydrogel are machined into blanks that are 12.7 mm diameter by 5.0 mm thick. Example 4 convex dry lens shapes are formed from the example 2 cylinders using conventional lathe cutting techniques known to persons of ordinary skill in the art. Example 4 dry lenses are eluted and hydrated in borate buffered saline for 18 hours, transferred to fresh borate buffered saline, and then thermally sterilized.

A Second Embodiment Ophthalmic Lens

A second embodiment ophthalmic lens comprises silicone hydrogel, and is prepared by the second method of making an ophthalmic lens. The lens has oxygen transmissibility (DK/t) preferably greater than 55, and more preferably greater than 70, and most preferably greater than 74. Variations of the lens are adapted to have on-eye water loss preferably less than 3% and most preferably less than 2%.

EXAMPLE 5

Example 5 is an ophthalmic lens that exemplifies the second embodiment ophthalmic lens, and is prepared by the example 4 method of making a contact lens. The example 5 contact lens, with an average center thickness of 0.08 mm, has an oxygen transmissibility (Dk/t) of approximately 75, and is adapted to have on-eye water loss of 2% or less.

Alternative Embodiments and Variations

The various embodiments, examples, and variations thereof, described above, are merely exemplary, and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For instance, embodiments of hydrogels include interpenetrating networks (IPNs) comprising a first polymer in molecular entanglement with a second polymer. The first polymer comprises a silicon-containing monomer. In some embodiments, the second polymer has a composition that differs from the first polymer. Embodiments include sequential IPNs, wherein the first polymer is synthesized in the absence of components of the second polymer. Subsequently, the first polymer is permeated with the components of the second polymer, whereupon a second polymerization is induced to generate the second polymer, which is consequently in molecular entanglement with the first polymer. In some embodiments, either or both of the first polymer and the second polymer are selected from a group consisting of examples 2, 3, 6, 7, 9, 10, 11, 12, 13, 14, 15, 16, and 17 hydrogel materials described above.

We claim:

1. A silicone hydrogel material comprising a copolymer, the copolymer including less than 5% styrene monomers or substituted styrene monomers, and the silicone hydrogel material having properties including:
    a fully hydrated water content greater than 60%;
    a $T_g$ greater than 27° C.;
    a modulus less than 1 MPa; and
    an oxygen permeability greater than 45 Barrers.

2. The silicone hydrogel material of claim 1, wherein the modulus is less than 0.70 MPa.

3. The silicone hydrogel material of claim 1, wherein the $T_g$ is greater than 70° C. and the copolymer includes between 1% and 10% by weight fluorine-containing monomer.

4. The silicone hydrogel material of claim 1, further having properties including a Shore D hardness greater than 70 at 21° C.

5. The silicone hydrogel material of claim 1, further having properties including a Shore D hardness greater than 80 at 21° C.

6. An ophthalmic lens comprising the silicone hydrogel material of claim 1 and having properties including an on-eye water loss of <3% after eight hours of continuous wear at an ambient temperature of 15-22° C. and approximately 60% relative humidity.

7. A method of making the opthalmic lens of claim 6 comprising lathe cutting the silicone hydrogel while the silicone hydrogel resides at greater than 20° C.

8. An ophthalmic lens comprising the silicone hydrogel of claim 1, and having properties including an on-eye water loss of less than 2% after eight hours of continuous wear at an ambient temperature of 15-22° C. and approximately 60% relative humidity.

9. The opthalmic lens of claim 8, wherein the copolymer includes between 2% and 8% by weight fluorine containing monomer.

10. A method of making the opthalmic lens of claim 8 comprising lathe cutting the silicone hydrogel while the silicone hydrogel resides at greater than 20° C.

11. A method of making an opthalmic lens comprising:
    providing the silicone hydrogel material of claim 1; and
    lathe cutting the silicone hydrogel material while the silicone hydrogel material resides at greater than 20° C.

12. An ophthalmic lens having properties including on-eye water loss of less than 3% after eight hours of continuous wear at an ambient temperature of 15-22° C. and approximately 60% relative humidity, and comprising a silicone hydrogel, the silicone hydrogel (i) comprising a silicone-containing monomer and (ii) having properties including a fully hydrated water content greater than 60% and a modulus less than 0.70 MPa.

13. The opthalmic lens of claim 12, wherein the silicone-containing monomer comprises an alkyl siloxy functional group.

14. The opthalmic lens of claim 13, wherein the silicone-containing monomer is selected from the group consisting of: 3-(tris(trimethylsiloxy)silyl)propyl methacrylate, tris(trimethylsiloxy)silylpropyl methacryloxyethyl carbamate, N-tris(trimethylsiloxysilylpropyl)acrylamide, and 1,3-bis(methacrylamidopropyl)1,1,3,3,-tetrakis(trimethylsiloxy) disiloxane, methacryloxyalkylsiloxanes, 3-methacryloxypropylpentamethyldisiloxane, bis(methacryloxypropyl)tetramethyldisiloxane, monomethacrylated polydimethylsiloxane, and monoacrylated polydimethylsiloxane.

15. The opthalmic lens of claim 14, wherein the silicone hydrogel comprises at least 5% by weight silicone-containing monomer.

16. The opthalmic lens of claim 15, further having properties including on-eye water loss of less than 2% after eight hours of continuous wear at an ambient temperature of 15-22° C. and approximately 60% relative humidity.

17. The opthalmic lens of claim 16, wherein the silicone hydrogel comprises at least 7.5% by weight silicone-containing monomer.

18. The opthalmic lens of claim 17, wherein the silicone hydrogel further has properties including a fully hydrated water content of 67% or greater.

19. The opthalmic lens of claim 18, wherein the silicone hydrogel further has properties including an oxygen permeability greater than 55 Barrers.

20. The opthalmic lens of claim 12, wherein the silicone hydrogel comprises at least 5% by weight silicone-containing monomer.

21. The opthalmic lens of claim 20, further having properties including on-eye water loss of less than 2% after eight hours of continuous wear at an ambient temperature of 15-22° C. and approximately 60% relative humidity.

22. The opthalmic lens of claim 21, wherein the silicone hydrogel comprises at least 7.5% by weight silicone-containing monomer.

23. The opthalmic lens of claim 22, wherein the silicone hydrogel further has properties including a fully hydrated water content of 67% or greater.

24. The opthalmic lens of claim 23, wherein the silicone hydrogel further has properties including an oxygen permeability greater than 55 Barrers.

25. The opthalmic lens of claim 12, wherein the silicone hydrogel further has properties including a fully hydrated water content of 67% or greater.

26. The opthalmic lens of claim 25, wherein the silicone hydrogel further has properties including an oxygen permeability greater than 55 Barrers.

27. An ophthalmic lens having physical properties including on-eye water loss of less than 3% after eight hours of continuous wear at an ambient temperature of 15-22° C. and approximately 60% relative humidity, and comprising a silicone hydrogel, the silicone hydrogel (i) comprising a copolymer, the copolymer including between 1% and 10% by weight fluorine-containing monomer and (ii) having properties including:
a fully hydrated water content greater than 60%; and
an oxygen permeability of greater than 55 Barrers.

28. The opthalmic lens of claim 27, wherein the silicone hydrogel further has properties including a modulus less than 0.70 MPa.

29. A method of making the opthalmic lens of claim 28 comprising lathe cutting the silicone hydrogel, wherein the opthalmic lens further has properties including an oxygen transmissibility greater than 62.5 after 8 continuous hours of wear.

30. The opthalmic lens of claim 28, further having properties including on-eye water loss of less than 2% after eight hours of continuous wear at an ambient temperature of 15-22° C. and approximately 60% relative humidity.

31. A method of making an opthalmic lens comprising:
providing a silicone hydrogel, the silicone hydrogel (i) comprising a copolymer, the copolymer including between 1% and 10% by weight fluorine-containing monomer, and (ii) having properties including:
an oxygen permeability greater than 52 Barrers;
a modulus less than 0.7 MPa;
a fully hydrated water content between 50% and 75%; and
lathe cutting the silicone hydrogel when the silicone hydrogel is substantially dehydrated and a temperature of a portion of the silicone hydrogel reaches a temperature greater than 27° C. during said lathe cutting.

32. An ophthalmic lens (i) comprising a silicone hydrogel, the silicone hydrogel comprising a copolymer, the copolymer including between 1% and 10% by weight fluorine-containing monomer, and (ii) having properties including:
a modulus less than 0.7 MPa;
an on-eye water loss of less than 3% after eight hours of continuous wear at an ambient temperature of 15-22° C. and approximately 60% relative humidity; and
an oxygen permeability greater than 56.25 Barrers.

33. The ophthalmic lens of claim 32, wherein the silicone hydrogel has properties including a fully hydrated water content greater than 60%.

34. The opthalmic lens of claim 32, wherein the copolymer includes between 2% and 8% by weight fluorine-containing monomer.

35. A method of making the ophthalmic lens of claim 32 comprising lathe cutting the silicone hydrogel, the silicone hydrogel being substantially dehydrated and at or above room temperature during the lathe cutting.

* * * * *